US012039215B2

United States Patent
Nguyen et al.

(10) Patent No.: US 12,039,215 B2
(45) Date of Patent: Jul. 16, 2024

(54) MULTIMODAL INPUT PROCESSING FOR VEHICLE COMPUTER

(71) Applicant: Cerence Operating Company, Burlington, MA (US)

(72) Inventors: Quynh Nguyen, Bothell, WA (US); Erland Unruh, Malmö (SE); Donni McCray, Seattle, WA (US); Christophe Couvreur, Sint-Pieters-Kapelle (BE); Lior Ben-Gigi, Hampstead (CA); Nils Lenke, Rheinbach (DE); Mohammad Mehdi Moniri, Düsseldorf (DE); Niels Does, Ulm (DE); Stefan Hamerich, Ulm (DE); Stefan Frank, Geislingen (DE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 16/241,025

(22) Filed: Jan. 7, 2019

(65) Prior Publication Data
US 2020/0218488 A1 Jul. 9, 2020

(51) Int. Cl.
*G06F 3/14* (2006.01)
*G02B 27/01* (2006.01)
(Continued)

(52) U.S. Cl.
CPC ....... *G06F 3/1423* (2013.01); *G02B 27/0101* (2013.01); *G06F 3/03547* (2013.01);
(Continued)

(58) Field of Classification Search
CPC .... G06F 3/005; G06F 3/0488; G06F 3/03547; G06F 3/04842; G06F 3/0236;
(Continued)

(56) References Cited

U.S. PATENT DOCUMENTS

| 9,958,870 | B1 * | 5/2018 | Graybill | G05D 1/02 |
| 2007/0008293 | A1 * | 1/2007 | Oldrey | G06F 3/04895 |
| | | | | 345/173 |
| 2007/0262965 | A1 * | 11/2007 | Hirai | B60R 11/0235 |
| | | | | 345/173 |
| 2010/0268426 | A1 * | 10/2010 | Pathak | G06F 3/0482 |
| | | | | 701/48 |

(Continued)

FOREIGN PATENT DOCUMENTS

WO 2014070872 A2 5/2014

OTHER PUBLICATIONS

Extended European Search Report, European Application No. 19908439.3, mailed Sep. 6, 2022 (9 pages).

*Primary Examiner* — Gerald Johnson
(74) *Attorney, Agent, or Firm* — Occhiuti & Rohlicek LLP

(57) ABSTRACT

Provided are a system and method of input to a computer in a vehicle. An electronic communication is formed between a first electronic device and a display of a second electronic device that is viewable by a user from a location in the vehicle, including providing by the first electronic device a first input mode for the second electronic device. A multimodal application is executed that permits the user to interact with the display of the second electronic device by a combination of the first input mode and at least one second input mode for the second electronic device. The combination of the first input mode and the at least one second input mode controls the display of the first electronic device.

28 Claims, 12 Drawing Sheets

(51) Int. Cl.
*G06F 3/0354* (2013.01)
*G06F 3/0482* (2013.01)
*G06F 3/04886* (2022.01)
*G06V 20/59* (2022.01)
*G06V 30/40* (2022.01)
*G06F 3/01* (2006.01)
*G06F 3/16* (2006.01)

(52) U.S. Cl.
CPC ........ *G06F 3/0482* (2013.01); *G06F 3/04886* (2013.01); *G06V 20/59* (2022.01); *G06V 30/40* (2022.01); *G02B 2027/014* (2013.01); *G06F 3/013* (2013.01); *G06F 3/017* (2013.01); *G06F 3/167* (2013.01)

(58) Field of Classification Search
CPC ...... G06F 3/0416; G06F 3/048; G06F 3/1423; G06F 3/038; G06F 3/14; G06F 2203/0382; G06F 3/017; G06F 3/011; G06F 16/638; G06F 3/016; G06F 16/248; G06F 1/3231; G09G 2380/10; G09G 2354/00; G10L 15/22; G10L 13/08; H04M 2201/38; B60W 50/14
See application file for complete search history.

(56) References Cited

U.S. PATENT DOCUMENTS

| | | |
|---|---|---|
| 2011/0161890 A1 | 6/2011 | Anderson et al. |
| 2013/0275138 A1* | 10/2013 | Gruber .................. G10L 13/00 704/260 |
| 2014/0019522 A1* | 1/2014 | Weng ..................... H04L 67/12 709/203 |
| 2014/0058584 A1 | 2/2014 | Weng et al. |
| 2014/0098008 A1* | 4/2014 | Hatton ................... G06T 11/00 345/8 |
| 2014/0281957 A1 | 9/2014 | Weng et al. |
| 2015/0022465 A1 | 1/2015 | Yamada |
| 2015/0253922 A1* | 9/2015 | Goodlein ................ G09G 3/36 345/173 |
| 2015/0291032 A1* | 10/2015 | Kim ...................... G06F 3/0488 701/36 |
| 2016/0282964 A9* | 9/2016 | Kim ........................ G06F 1/1647 |
| 2018/0024695 A1* | 1/2018 | Iyer ........................ B60K 35/00 345/175 |
| 2018/0341330 A1* | 11/2018 | Parker .................... G10L 15/22 |
| 2019/0084418 A1* | 3/2019 | Barrera ............... B60R 11/0235 |
| 2019/0299855 A1* | 10/2019 | Ostapenko ............ B60W 50/14 |
| 2019/0384488 A1* | 12/2019 | Kapinos ................. G06F 3/167 |

\* cited by examiner

MULTIMODAL INPUT PROCESSING FOR VEHICLE COMPUTER

FIELD OF INTEREST

The present inventive concepts relate generally to the field of computer input techniques, and more particularly to multimodal inputs to a vehicle computer.

BACKGROUND

User interaction with applications executed on mobile electronic devices such as smartphones, tablets, notebooks, or the like generally occurs by a user using a finger or stylus to select keyboard characters displayed on a touchscreen display or as buttons on a standalone computer keyboard. Modern personal computers can be configured with a graphical user interface (GUI), speech-to-text, time of flight (ToF) camera for gesture recognition, and/or other peripheral or input/output devices for non-voice modes, e.g., keyboard, touchscreen, mouse. Such computer accessories can provide users with different computer input modes. As automobiles are increasingly deployed with computer technology, it is desirable for the computer technology to be accessible by a combination of touchscreen computers, driver monitoring camera sensors for eye gaze tracking, ToF cameras for gesture recognition, voice-activated commands, and/or other modes of interaction.

SUMMARY

In accordance with aspects of the inventive concepts, provided is a method of input to a computer in a vehicle, comprising forming an electronic communication between a first electronic device and a display of a second electronic device that is viewable by a user from a location in the vehicle, including providing by the first electronic device a first input mode for the second electronic device; executing a multimodal application that permits the user to interact with the display of the second electronic device by a combination of the first input mode and at least one second input mode for the second electronic device; and controlling, by the combination of the first input mode and the at least one second input mode, the display of the first electronic device.

In various embodiments, the display of the second electronic device includes a heads-up display, touch-sensitive windshield, or other device for projecting or displaying information on a windshield or other display medium of a vehicle.

In various embodiments, the first input mode is a first touchpad computer input in response to a receipt of a first amount of pressure applied to the touch-sensitive display of the first electronic device and the at least one second input mode includes a second touchpad computer input in response to a second amount of pressure applied to the touch-sensitive display of the first electronic device greater than the first amount of pressure.

In various embodiments, the multimodal application homologically maps positions on a display of the first electronic device and the homologically to a virtual keyboard displayed by the second electronic device at a windshield or other display medium of the vehicle.

In various embodiments, the method further comprises performing a swipe typing operation that includes establishing a starting point on the second electronic device by activating a location on the display of the first electronic device that corresponds to the starting point on the second electronic device.

In various embodiments, the first input mode is an input from a touch-sensitive keyboard or display of a touchpad computer, a data input from a computer device remote from and in communication with the touchpad computer, a speech interface, an eye gaze detection device, a tactile input device, a camera for gesture recognition, or a combination thereof.

In various embodiments, controlling the display of the first electronic device comprises: displaying a list of items or group of objects on the display of the second electronic device; activating a cursor at the display of the second electronic device; moving the cursor to an item of interest of the list of items or an object of interest of the group of objects in response to a first input to the first electronic device; and selecting the item of interest or object of interest in response to a second input to the first electronic device.

In various embodiments, the first electronic device includes two electronic devices, wherein a first of the two electronic devices receives the first input and in response provides a first output of the first input mode to the second electronic device, and wherein the second of the two electronic devices receives the second input and in response provides a second output of the first input mode to the second electronic device.

In various embodiments, the first electronic device includes a touch-sensitive display where a swipe typing operation is performed for moving the cursor to the item of interest.

In various embodiments, the first electronic device captures an address and the multimodal application processes the address for use by a navigation system, which in response outputs navigation information related to the address to the second electronic device.

In various embodiments, the first input mode is a camera that provides a digital photograph, text, or graphics from a document to an analysis system to determine the address.

In various embodiments, the first electronic device is at least one of a camera, touchpad computer, a speech interface, an eye gaze detection device, or a tactile input device.

In various embodiments, the method further comprises identifying objects in a field of view of the user, and determining by the multimodal application the address from the identified objects.

In accordance with other aspects of the inventive concepts, provided is a multimodal input processing system, comprising: a processor to form an electronic communication between a first electronic device and a display of a second electronic device that is viewable by a user from a location in the vehicle; a processor to provide a first input mode from the first electronic device for the second electronic device; a processor to execute a multimodal application that permits the user to interact with the display of the second electronic device by a combination of the first input mode and at least one second input mode for the second electronic device; and a processor to control the display of the first electronic device by a combination of the first input mode and the at least one second input mode.

In various embodiments, the multimodal input processing system further includes a processor that executes the multimodal application to homologically map positions on a display of the first electronic device to a display by the second electronic device at a windshield or other display medium of the vehicle.

In various embodiments, the multimodal input processing system further includes a processor that identifies a starting point on the second electronic device by detecting an activated location on the display of the first electronic device that corresponds to the starting point on the second electronic device.

In various embodiments, the multimodal input processing system further comprises a processor that controls the display of the first electronic device by activating a cursor at the display of the second electronic device; moving the cursor to a location of interest in response to a first input to the first electronic device; and selecting the item of interest or object of interest in response to a second input to the first electronic device.

In various embodiments, the multimodal input processing system further comprises a processor that receives an address captured by the first electronic device and processes the address for use by a navigation system, which in response outputs navigation information related to the address to the second electronic device.

In various embodiments, the first input mode is a camera that provides a digital photograph, text, or graphics from a document to an analysis system to determine the address.

In various embodiments, the multimodal input processing system further comprises a processor that receives data from the first electronic device that identifies objects in a field of view of the user; and determines the address from the identified objects.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
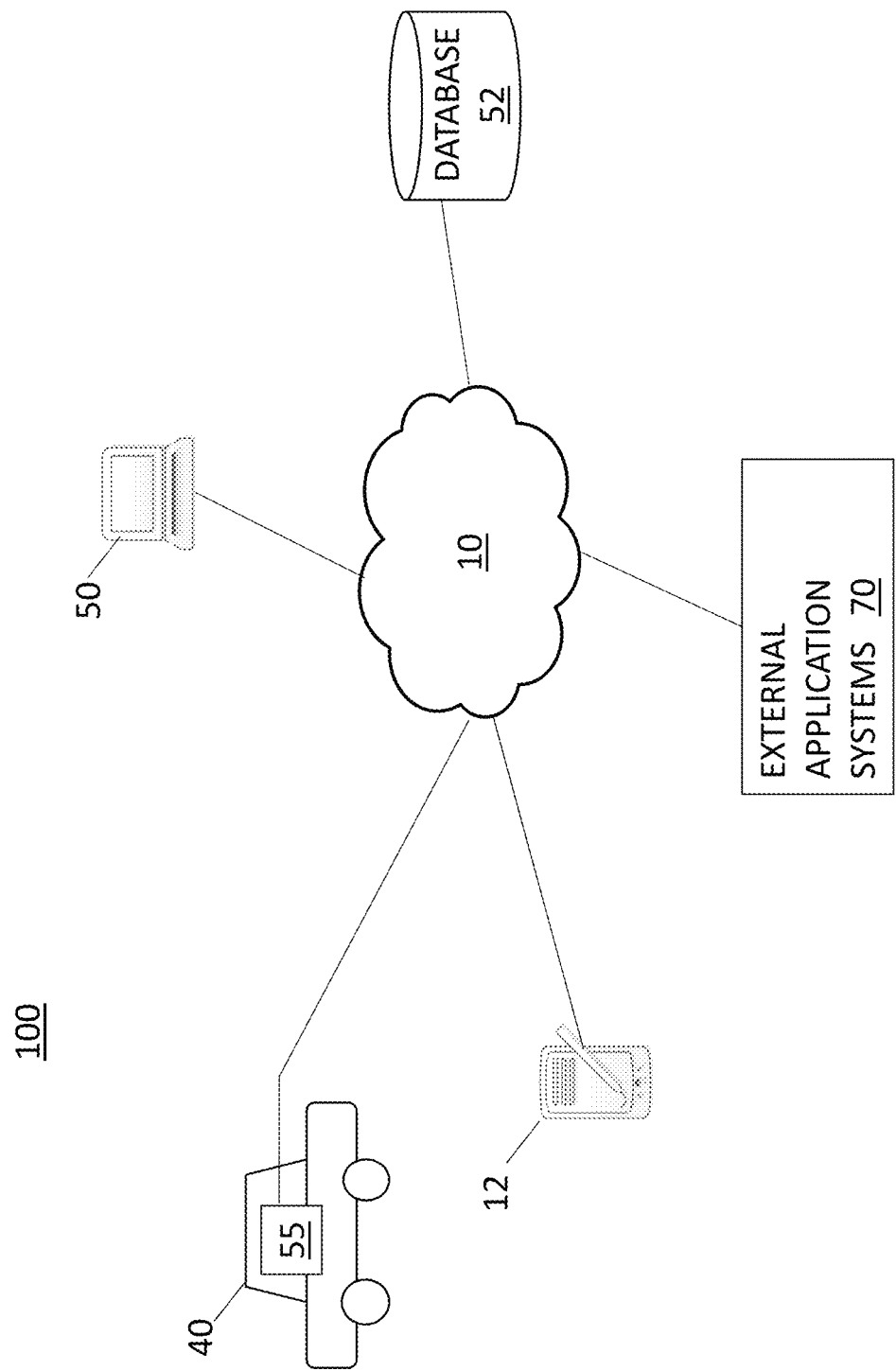
FIG. 1 is a network diagram of an embodiment of a computer architecture within which data is input by a vehicle operator, passenger, or other user when a conventional keyboard is unavailable, not feasible, or unpractical, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items. The term "or" is not used in an exclusive or sense, but in an inclusive or sense.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with aspects of the inventive concepts, electronic devices of a vehicle and/or personal computing devices otherwise in communication with a vehicle computer are constructed and arranged to control an output of data, information, graphics, audio, video, or the like on a vehicle display, e.g., a heads-up display (HUD), by executing an multimodal input application at a special-purpose computer processor, e.g., speech-to-text conversion or other voice-based control, on-screen keyboard, touchscreen or touchpad, gesture recognition, biometrics, and so on, or a combination thereof, and establishing a data exchange between various input devices and the vehicle display. In various embodiments, the HUD, can be or include a projection on a visor or windshield, e.g., as a windshield display, as examples, or other display medium of a vehicle.

FIG. 1 is a network diagram of an embodiment of an architecture 100 within which data is input by the driver of a vehicle 40 when a conventional computer keyboard is unavailable, not feasible, or impractical for purposes of entering data for processing by a vehicle's electronic device, in accordance with aspects of the inventive concepts.

In the overall architecture 100 of FIG. 1, a variety of systems and devices can communicate via one or more wired and/or wireless communication systems, networks, and/or channels, collectively represented by a network 10, generally referred to as a "cloud." The communication systems, networks, or the like can include, but need not be limited to, wide area and/or local area networks, such as the Internet, Global Positioning System (GPS), cellular networks, Wi-Fi, Bluetooth, and so on. Various electronic devices of the architecture 100, such as a multimodal input processing system 55, personal computing device 12 such as a driver or passenger smartphone, and so on can exchange data with the remote computer 50, remote database 52, and/or external application systems 70 via the network cloud 10. Remote computer 50, remote database 52, and/or external application systems 70 can provide navigation, music or other audio, program content, marketing content, internet access, speech recognition, cognitive computing, artificial intelligence, and so on via network cloud 10 to the vehicle 40. Remote computer 50, remote database 52, and/or external application systems 70 may include one or more computer hardware processors coupled to one or more computer storage devices for performing steps of one or more methods, for example, shown in FIGS. 4-12.

In FIG. 1, vehicles 40 are generally represented as automobiles, but the inventive concepts are not limited thereto. While embodiments of the present invention are generally described herein in the context of automobiles, the inventive concepts can be applied to any type of vehicle, e.g., trucks, busses, motorcycles, planes or other aircraft, bicycles, trains, watercraft, military vehicles, industrial vehicles, emergency vehicles, and the like. Additionally, the inventive concepts can, in some embodiments, be applied to autonomous, partially autonomous, self-driving, driverless, or driver-assisted vehicles.

Figure 2:
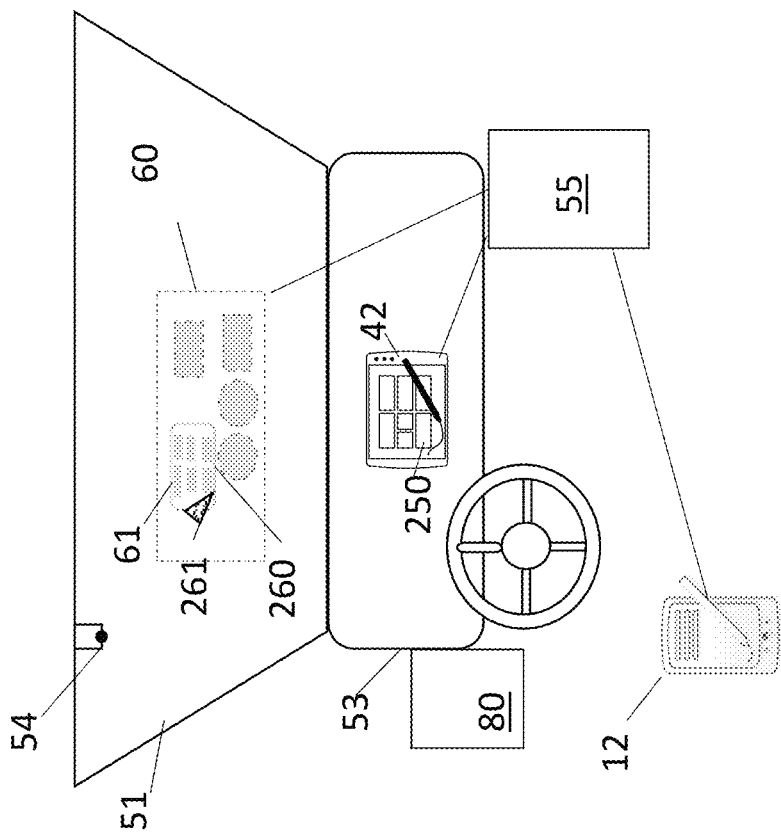
FIG. 2 is view of an embodiment of an interior of a vehicle, in accordance with aspects of the inventive concepts.
Figure 3:
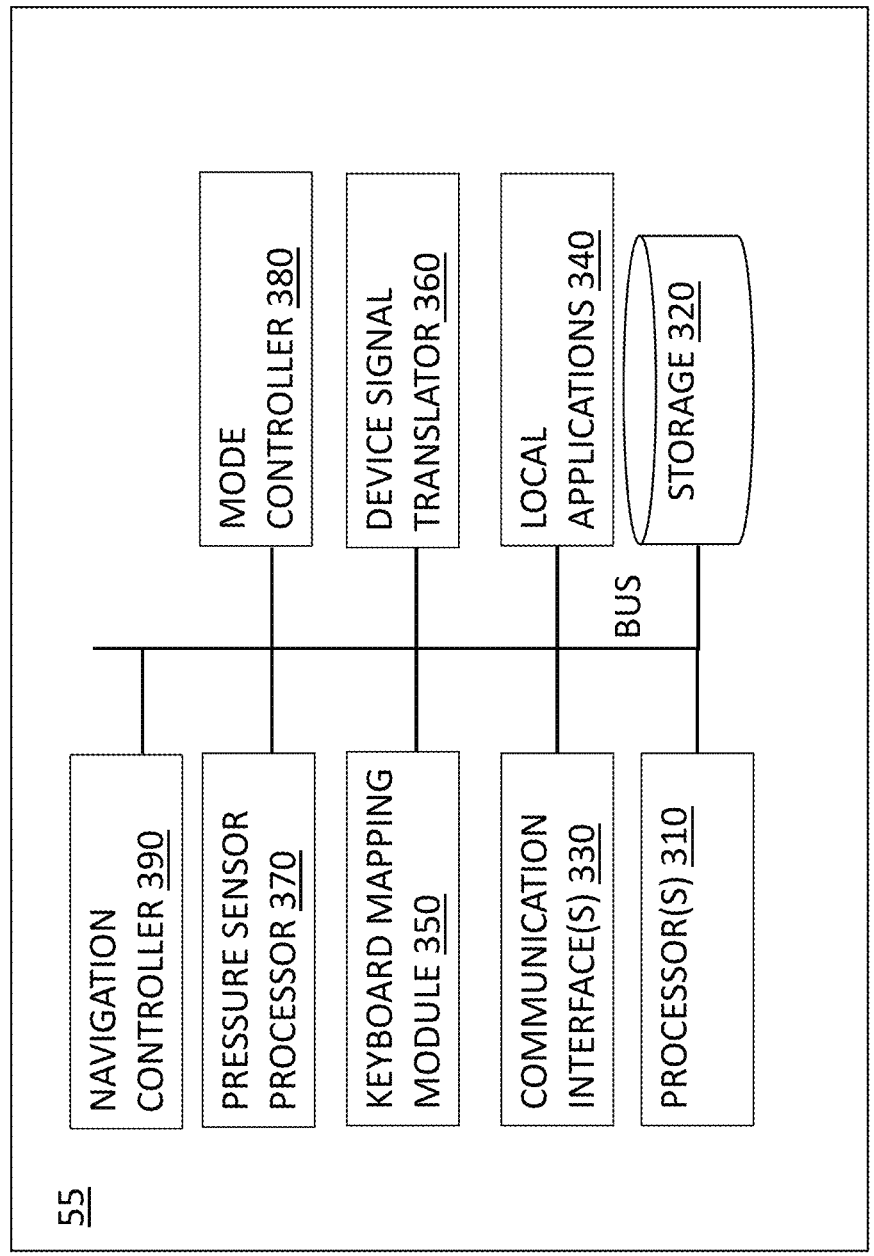
FIG. 3 is a block diagram of an embodiment of a multimodal input processing system, in accordance with aspects of the inventive concepts.

As shown in FIGS. 2 and 3, the various electronic devices of the vehicle 40 can include computer and communication systems that receive user inputs in the form of text, voice commands, or a combination thereof. A multimodal input processing system 55 can be part of or hosted by the vehicle 40. The multimodal input processing system 55 stores and executes a multimodal application that supports an interaction in accordance with one or more voice and non-voice modes, and more specifically, combines or otherwise permits the operational coexistence of multiple user input modes or channels in the same interaction allowing a vehicle driver, passenger, or other user to interact with a vehicle display 60, such as a vehicle heads-up display (HUD) 60, through multiple input modes or channels. In some embodiments, the multimodal input processing system 55 can be part of a vehicle head unit responsible for processing multiple data input modes, which are provided by user or machine inputs to peripheral or input/output devices of the various computer devices of the vehicle 40 and/or personal computing devices 12 of a user of the vehicle 40, such as mobile phones, tablets, phablets, personal computers, laptop computers, televisions (including smart televisions) and so on. In some embodiments, the remote computer 50, database 52 and/or external application systems 70 can cooperatively communicate with a local applications processor 340 (see FIG. 3) of the multimodal input processing system 55 to carry out functionality of the various computer devices of the vehicle 40. In other embodiments, the local applications processor 340 facilitates data exchanges between electronic devices of the vehicle 40, such as touchpad 42 and a personal computer 12, and HUD 60 or other projection or display device. In some embodiments, a personal computing device 12 can be in physical or wireless communication with other computer elements of the vehicle 40, such as the HUD 60 of the vehicle 40, via a wireless interface of the multimodal input processing system 55.

As shown in FIG. 3, in some embodiments, the multimodal input processing system 55 includes at least one processor 310 coupled to at least one computer storage device or memory 320, e.g., via at least one bus (BUS). In various embodiments, the multimodal application is configured to utilize one or more processor(s) 310 and computer storage 320 of a vehicle computer or system, and to share these assets with other electronic devices of the vehicle 40. The computer storage 320 can take the form of any now known or later developed computer storage device, including, but not limited to, a hard drive, random access memory in its various forms, read only memory in its various forms, and/or a compact disc, as examples. The computer storage 320 can store program code, instructions, and data necessary for the multimodal input processing system 55 to carry out its tasks, including performing one of more methods of FIGS. 4-12.

At least one communication interface module 330 can be configured to enable the vehicle 40 and/or multimodal input processing system 55 to communicate and exchange information and data with systems and subsystems external to the vehicle 40 and local to or onboard the vehicle. The communication interface module 330 can also enable communication with the external applications 70.

The multimodal input processing system 55 can include one or more input and output devices for exchanging data processed by the system 55 with other elements of the environment of FIG. 1, and specifically the vehicle 40 of FIG. 2. Examples may include, but are not limited to, navigation system outputs (e.g., time sensitive directions for a driver), incoming text messages converted to output speech, vehicle status outputs, and the like, e.g., output from a local or onboard storage medium or system. In some embodiments, the communication interface module 330 provides input/output control functions with respect to one or more electronic devices, such as the HUD 60, touchpad 42, and/or personal computer 12 of the driver or passenger. An example of an input/output control function may include managing the buffering and output of data and the storage of data in computer storage 320 for subsequent use by other elements of the multimodal input processing system 55. Other input devices providing at least one of a first input mode and/or a second mode may include, but not be limited to, a computer keyboard, image scanner, microphone, speech recognition module or elements, pointing device, graphics tablet, mouse, optical device, trackball, refreshable braille display, optical character recognition (OCR) technology, 3D modeling computer, sensors, such as infrared sensors or the like, or a combination thereof.

In some embodiments, the multimodal input processing system 55 further comprises a keyboard mapping module 350 that applies a homology algorithm or the like to establish a same or similar relative position of keyboard characters of the touchpad 42 or related touch-sensitive input device and those of the virtual keyboard 61 displayed on the vehicle display medium 51, e.g., a windshield or visor. In some embodiments, the vehicle display medium 51 may be a touchable display medium for receiving data signal inputs for performing a swipe typing operation or other touch-related operation at the vehicle display medium 51. In other embodiments, the keyboard 61 is projected near the top of the vehicle display medium 51, e.g., a windshield or visor, for example, within reach of the user for providing input to the keyboard 61.

For example, referring to FIG. 2, character 250 of touchpad 42 can be homologically mapped to a character 260 displayed at virtual keyboard 61, so that when character 250 is touched or otherwise selected at touchpad 42, character 260 of keyboard can be displayed as being selected, for example, by being highlighted, enlarged, or otherwise displayed in a manner so that a viewer can recognize that the character 260 was selected, for example, by proxy from the touchpad 42. In some embodiments, a swipe typing operation may be performed. Here, multiple characters forming a word or other arrangement of objects, characters, or the like may be created by moving a finger or object such as a stylus over the keyboard. In these embodiments, this movement is mapped homologically, and the starting point of the swipe typing operation is selected by establishing the relationship between a location on the virtual keyboard 61 and the location on the touchpad 42 where the finger or object directly or indirectly contacts the display of the touchpad 42.

In some embodiments, the multimodal input processing system 55 further comprises a device signal translator 360, for example, that converts signals received by a first electronic device, such as the touchpad 42, to data for controlling the HUD 60. For example, the touchpad 42 may communicate with a driver monitoring camera 54 in the vehicle 40 that monitors driver or passenger eye movements by sensing light, for example, infrared or related radiation reflected from the pupil(s). This captured data can be processed by the device signal translator 360 to translate the eye movement data received from the touchpad 42 to movements of the cursor 250 displayed at the HUD 60.

In some embodiments, the multimodal input processing system 55 further comprises a pressure sensor processor 370 that receives data from the touchpad 42 that distinguishes pressures or related forces applied to the display screen of the touchpad 42 and/or other electronic device in communication with the multimodal input processing system 55. For example, a user may use a finger or stylus to apply a light touch or low amount of pressure to the touchpad 42. The pressure sensor processor 370 can, in response, instruct the HUD 60 to display an object, keyboard character, and so on in response to the activated light pressure. The pressure sensor processor 370 may receive a signal having a different amount of pressure, for example, greater force or greater amount of time that the force is applied to the display screen. A different command may be generated to execute the object in response to this greater or longer force, for example, activate a keyboard character when a greater amount of pressure is applied and/or the pressure is applied for a greater amount of time.

In some embodiments, the multimodal input processing system 55 further comprises a mode controller 380 that facilitates one or more input modes with respect to the HUD 60 and/or other computer display controlled by various modes, e.g., touchpad, computer mouse, gaze technology, and so on. In particular, the mode controller 380 controls data input to the HUD 60 from various input modes, such as gesture, speech, tactile, gaze, augmented reality, monitoring cameras, navigation devices, and so on. For example, the mode controller 380 can monitor eye gaze tracking information and determine when an eye gaze is directed to the virtual keyboard 61 so that the touchpad 42 can be activated to output commands to the HUD 60 to select characters, icons, display buttons, and so on identified and/or determined from the directed eye gaze.

Figure 4:
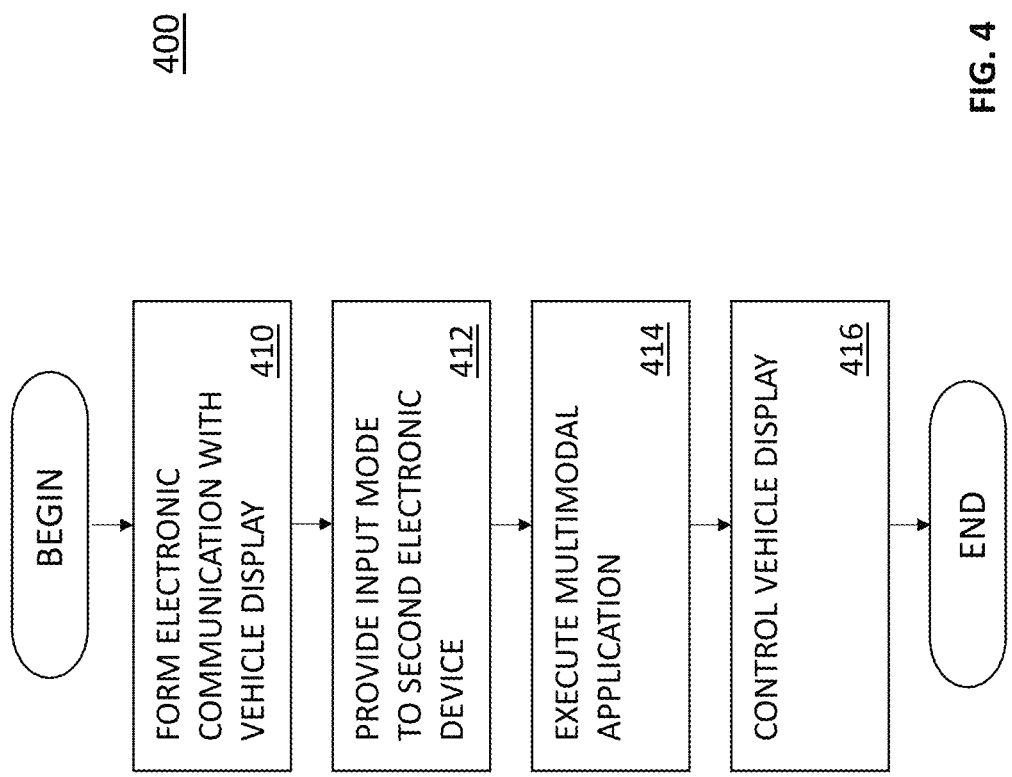
FIG. 4 is an embodiment of a method of input to a computer that can be performed by the system of FIGS. 1-3, in accordance with aspects of the inventive concepts.

FIG. 4 is an embodiment of a method 400 of input to a computer that can be performed by the system of FIGS. 1-3, in accordance with aspects of the inventive concepts. In describing method 400, reference is made to elements of FIGS. 1-3. As described herein, text and/or other data can be input by a vehicle driver in a driving car, parked car, or autonomous vehicle in situations where a keyboard or related peripheral computer input/output component is not available or not feasible during use, for example, a virtual keyboard of a smartphone while driving the vehicle 40.

In step 410, an electronic communication is formed, for example, by the multimodal input processing system 55, between a first electronic device and a display of a second electronic device, for example, HUD 60, touch-sensitive windshield, and/or related device for displaying data on the windshield, console, or region of interest in the vehicle. In some embodiments, the first electronic device is a touchpad 42 at a vehicle console 53 as shown in FIG. 2. In other embodiments, the first electronic device is an eye-driven communication system, including a camera that receives light reflections from a user's pupil(s), which is processed to translate the movement of the user's eyes into mouse cursor movements or the like for output, to the second electronic device 60. In other embodiments, the first electronic device is a voice or audio input device.

In step 412, a first input mode is provided by a first electronic device, such as the touchpad 42 or other electronic device, to the HUD 60. In some embodiments, the first input mode includes a touchpad computer input, for example, so that the HUD 60 can receive and process commands or the like for controlling a movement of a cursor 261 displayed on the HUD 60 for selecting characters of the virtual keyboard 61. In other embodiments, the first input mode includes a display-less touchpad computer input, for example, the touchpad 42 includes a touch-sensitive keyboard but includes no display. Here, the user input can be a swiping motion or other human gesture received by the keyboard, but the display is external to the touchpad device 42. In other embodiments, the first input mode is a mode in which a camera and/or other sensor for detecting eye movements is used by the multimodal input processing system 55 to control functions of the HUD 60. In other embodiments, other input devices may provide various input modes to control functions of the HUD 60, such as gesture recognition, speech recognition, augmented reality, monitoring cameras, navigation devices, and so on, which provide inputs to the multimodal input processing system 55 for communicating with the HUD 60 according to various input modes, either individually or simultaneously.

In step 414, the multimodal input processing system 55 executes a multimodal application that permits multiple input modes, for example, a combination of the first input mode in step 412 and at least one other input mode, referred to as a second input mode, to interact with the display of the second electronic device. In some embodiments, the first input mode can include multiple inputs, for example, provided by a microphone to enter speech commands such as "drive me there" in conjunction with a camera 54 providing data determined from a vehicle driver's gaze in a direction of a destination of interest. The second input mode can provide an output or update on the display of the second electronic device, such as update a map that indicates the destination of interest (see, for example, FIG. 9).

In step 416, the vehicle display, e.g., HUD 60 or other device providing a display on the windshield or other vehicle display medium, is controlled by the output of the executed multiple modal application, which is determined by the combination of first input mode of step 412 and the at least one second input mode. In some embodiments, a first input mode may be a signal output in response to a user applying a slight amount of pressure in the form of a light touch by a stylus or other pointed object or by finger to the touchpad 42 to activate a cursor 261 displayed on the vehicle display medium 51, e.g., windshield. When activated, the cursor 261 moves to various regions of the HUD 60 commensurate with movement of a finger or stylus about the display of the touchpad 42. This is achieved by the touchpad 42 outputting commands to the HUD 60 to move the cursor 261 accordingly.

The second input mode may be a signal output to the HUD 60 from the same or different electronic device than the touchpad 42. In cases where the same electronic device, e.g., touchpad 42, is used for both the first and second input modes, the second input mode may be provided in response to the user applying a greater amount of pressure or applying a similar amount of force for a greater amount of time to the touchpad 42 than that provided by the first input mode. This action could be used, for example, to control the cursor 261 positioned on the screen at or near a character 260 to activate the character 260 displayed at a HUD keyboard 61 so that the character is entered as input to a computer and/or is highlighted or otherwise indicated as being activated.

In another example, a second input mode may pertain to a different electronic device than that of the first input mode. For example, a second input mode may be provided by a driver monitoring camera 54, which can control the cursor 261 displayed at the vehicle display medium 51, e.g., a windshield 51.

In another example, a user may provide an input mode directly from a touchable vehicle display medium, e.g., windshield display, and/or from a displayed keyboard that is sensitive to touch. Here, the user can enter information on the vehicle display medium, e.g., on the windshield, before starting the vehicle. Other first and/or second input modes may be available in connection with an input mode via the vehicle display medium, e.g., windshield.

Figure 5:
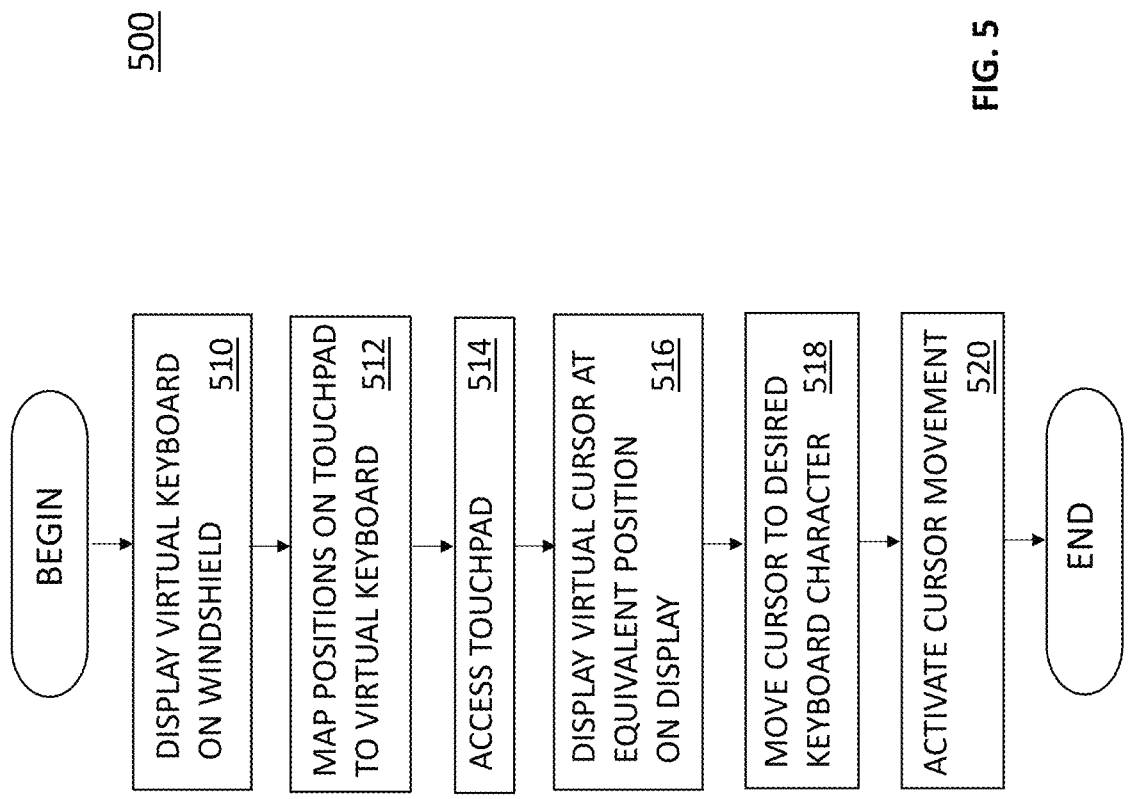
FIG. 5 is an embodiment of another method of input to a computer that can be performed by the system of FIGS. 1-3, in accordance with aspects of the inventive concepts.

FIG. 5 is an embodiment of a method 500 of input to a computer that can be performed by the system of FIGS. 1-3, in accordance with aspects of the inventive concepts.

In step 510, a virtual keyboard 61 is displayed, for example, as part of a display at the HUD 60, on a windshield 51 of vehicle 40 shown in FIG. 2. Other embodiments of the invention provide display locations of use to passengers, or of use to the driver on a periodic basis only. The virtual keyboard 61 permits a driver, passenger, and/or other viewer to see the keyboard. As described herein, the multimodal input processing system 55 permits the viewer(s) to see the keyboard 61 relative to their fingers while they perform typing from the touchpad 55.

In step 512, positions on the touchpad 42 are mapped homologically to the virtual keyboard 61 on the display, for example, by the multimodal input processing system 55. For example, a displayed image of the virtual keyboard 61 can comprise an illustration or representation a individual input components touched, such as a letter key (e.g., M, N, O, etc.) or other keyboard character 250 touched on a typing keyboard, a note key (e.g., middle C) touched on a piano keyboard, a number pushed on a cell phone, and so on. In doing so, the virtual keyboard 61 displays an indication of the corresponding selected character 260, for example, by moving cursor 261 to the corresponding selecting character 260. This permits a dashboard 53, or console or other control panel of the vehicle 40 to be operated without undue concentration by a user, e.g., a vehicle driver, on visually reading the display of the touchpad 42 while working the controls, e.g., selecting keys, characters, or the like on the touchpad display while viewing the selection on the windshield 51, which is achieved by the selection of the starting location for the cursor 261 with respect to characters, words, objects, and so on.

In step 514, the touchpad 42 is accessed, for example, by a user lightly touching the touchpad. In response, in step 516, a virtual cursor is shown at an equivalent position on the displayed virtual keyboard 61. For example, when character 250 is touched on touchpad 42, a virtual cursor 261 is dynamically displayed at the HUD 60 that identifies the touched input of the character 250. In some embodiments, every touchpoint on the touchpad 42 is directly mapped to a location of the HUD 60. A feature includes an amount of force, pressure, or the like with respect to a user touching the touchpad 42, using a finger or object for physically applying a force to the surface of the touchpad 42. A threshold amount of force applied to the touchpad keyboard may activate the system to display the virtual cursor 261.

In step 518, the cursor 261 can be moved to another region of the virtual keyboard 61. In response to a selection of a starting point, the cursor 261 may be moved by performing a swipe typing operation at the touchpad 42.

In step 520, a movement of the cursor is activated by a different amount of force, pressure, or the like than that applied by the user in order to display the virtual cursor 261 in step 516. For example, the user can perform a typing operation on a keyboard of the touchpad 42 by performing a user gesture such as the swiping movement on a touchscreen or keyboard of the touchpad 42, referred to as swipe typing. The touchpad 42 may provide related features, such as predictive text, where the computer learns from user habits when performing a typing operation of the keyboard.

Although features of method 500 are described with reference to the touchpad 42, the method steps can equally apply to other electronic input devices, such as a vehicle driver or passenger smartphone 12. Here, the multimodal input processing system 55 establishes communications between the smartphone 12 and the HUD 60 so that user actions, such as text application entries to the smartphone 12, can be viewed on the HUD 60. Method steps of other methods, for example, described with reference to FIGS. 6-10, can also equally apply to other electronic devices.

Figure 6:
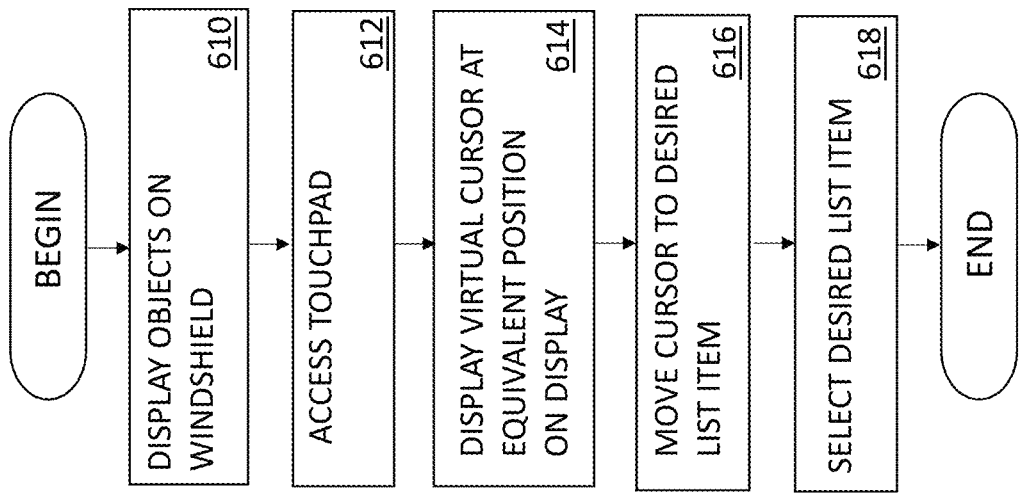
FIG. 6 is an embodiment of another method of input to a computer that can be performed by the system of FIGS. 1-3, in accordance with aspects of the inventive concepts.

FIG. 6 is an embodiment of another method 600 of input to a computer that can be performed by the system of FIGS. 1-3, in accordance with aspects of the inventive concepts. The method 600 when executed permits a touchpad 42 to be used to select items from a list displayed on a vehicle display medium 51, such as a windshield. Other display object techniques may similarly apply. For example, in a method shown herein, one display object may be selected when establishing a starting point of the operation by the multimodal input processing system 55 in response to a user-initiated action at the touchpad 42, then extended with a "lasso" to select multiple objects. A lasso-based selection may be performed by gesture, touch-based, gaze, or other input modes, for example, described herein.

Figure 9:
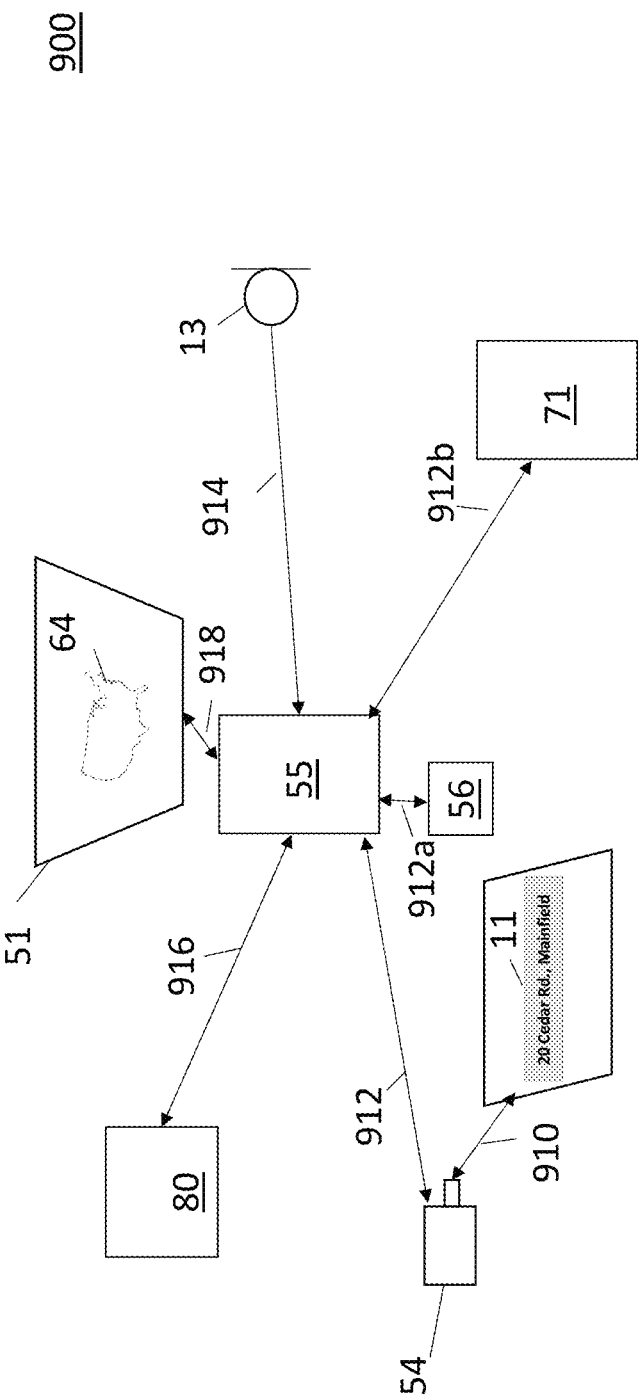
FIGS. 9-12 are various embodiments of a computer architecture including data flow paths between elements of the architecture, in accordance with aspects of the inventive concepts.

In step 610, a second electronic device, such as HUD 60, displays a list of items such as music titles, a group of objects, or other arrangement of icons, objects, listings, and so on. The arrangement of a list displayed on the HUD 60 or related projection on the windshield 51 may be predetermined and preprogrammed in a vehicle computer by an original equipment manufacturer (OEM) or other entity, for display by the HUD 60 according to a desired arrangement. In some embodiments, as shown in FIG. 9, a map 64 is displayed by the HUD 60. In some embodiments, a user can select a location on the map 64, which is used as an input for navigation applications, for example, described at least in FIGS. 9 and 10. In some embodiments, the list of items is constrained to possible matches to nearby locations, frequently visited locations, or other predetermined criteria.

In step 612, the touchpad 42 is accessed, for example, by a user lightly touching the touchpad. In response, in step 614, a virtual cursor 261 is shown at an equivalent position on the displayed virtual keyboard 61, for example, similar to steps 514, 516 of FIG. 5. This can be performed by the mapping module 350 and/or pressure sensor processor 370 of the multimodal input processing system 55.

In step 616, the cursor 261 can be moved to the desired list item. The multimodal input processing system 55 can send an instruction to the HUD 60 to move the cursor 261 to a displayed object mapped to a counterpart object displayed on the touchpad 42, smartphone 12, or other electronic device used by the vehicle driver or passenger to enter information.

At step 618, the desired list item is selected. The multimodal input processing system 55 may receive a signal indicative of a greater amount of force, pressure, or the like applied to a region of the touchpad 42, smartphone 12, or the like that the force, pressure, touch, or the like performed in step 612.

In other embodiments, another input mode may be detected and processed, for example, a voice command instructing the system to "select this one." Other input modes may equally apply, such as tactile, voice, and/or biometric inputs.

In other embodiments, when a map 64 (see FIG. 9) is displayed and a location on the map is selected, a navigation process may be executed, for example, whereby a Unix desktop environment (UDE) is provided for performing at least one step in the navigation process.

Figure 7:
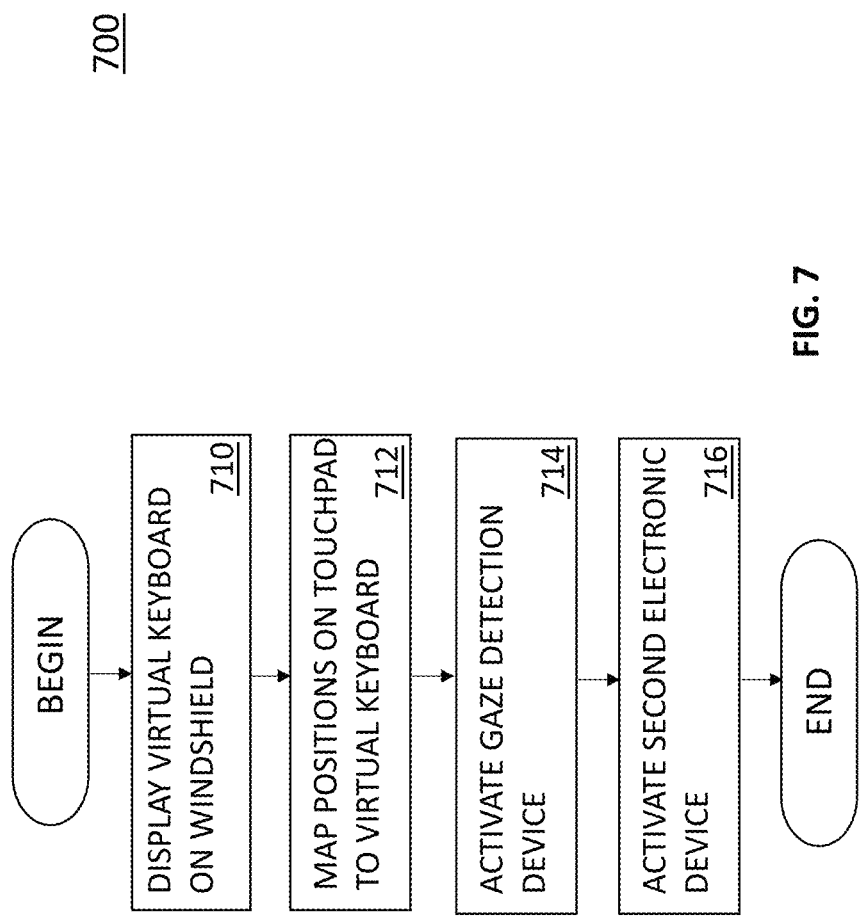
FIG. 7 is an embodiment of another method of input to a computer that can be performed by the system of FIGS. 1-3, in accordance with aspects of the inventive concepts.

FIG. 7 is an embodiment of another method 700 of input to a computer that can be performed by the system of FIGS. 1-3, in accordance with aspects of the inventive concepts.

In step 710, the HUD 60 displays a virtual keyboard 61, for example, similar to step 510 of FIG. 5. In step 712, positions on the touchpad 42 are mapped homologically to the virtual keyboard 61 on the display, for example, similar to step 512 of the method 500 of FIG. 5. In step 714, a gaze or related eye movement detection device, such as but not limited to a driver monitoring camera 54, is activated to monitor a user's eye movement, such as a vehicle driver or passenger. In response, the multimodal input processing system 55 receives and processes the collected eye movement data to determine if the user is directing a gaze at the virtual keyboard 61, or more specifically, to a particular region of the virtual keyboard 61 where a character 260, or key, button, icon, graphical representation, and so on is displayed. The virtual cursor 261 may be displayed at this region where the user's gaze is determined by the driver monitoring camera 54.

In step 716, a second electronic device is activated. In some embodiments, when the user touches the touchpad 42, the HUD 60 is activated, whereby the virtual cursor 261 remains at the position determined by the gaze in step 714 so that swipe typing or the like can be performed on the touchpad 42 to control the movement of the virtual cursor 261. In other embodiments, a gesture detection device determines the location of the virtual cursor 261, for example, at a position on the windshield 51 where the user directs one or both eyes, i.e., gazes at a starting character at the virtual keyboard 61 displayed on the windshield 51. In these other embodiments, a swipe typing operation or the like can be performed on the touchpad 42 to control the movement of the virtual cursor 261 and to establish a starting point for a swipe typing operation.

Figure 8:
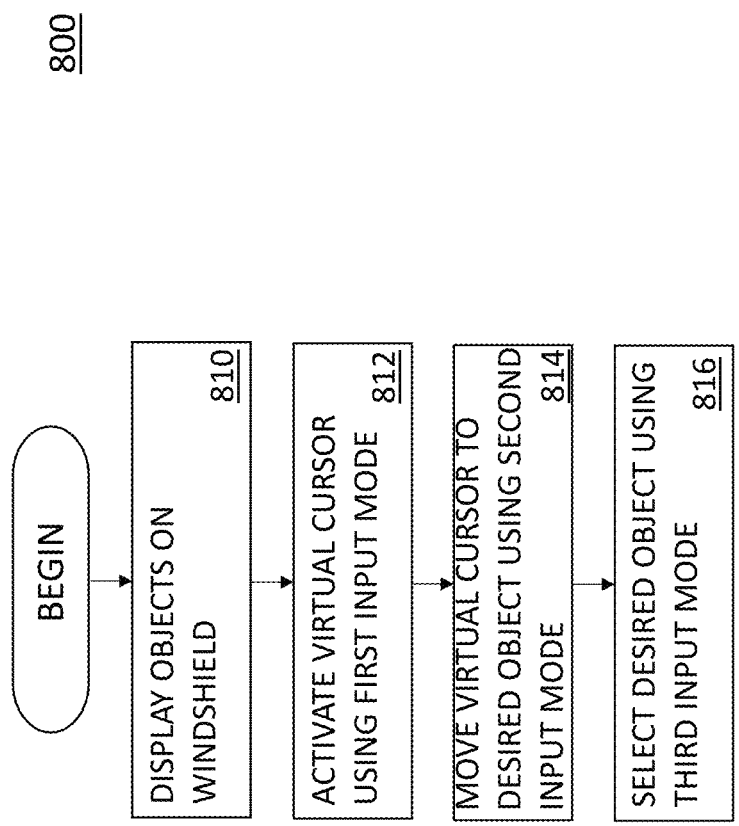
FIG. 8 is an embodiment of another method of input to a computer that can be performed by the system of FIGS. 1-3, in accordance with aspects of the inventive concepts.

FIG. 8 is an embodiment of another method 800 of input to a computer that can be performed by the system of FIG. 3, in accordance with aspects of the inventive concepts. In describing method 800, reference is made to elements of FIGS. 1-3.

In step 810, the HUD 60 displays a list of items such as music titles, a group of objects, or other arrangement of icons, objects, listings, and so on, for example, for example, similar to step 610 of FIG. 6.

In step 812, a virtual cursor 261 of the HUD 60 is activated by a first input mode. In some embodiments, the first input mode includes eye gaze technology that detects an eye movement of the driver, for example, gazes at a location of the arrangement displayed on the windshield 51, whereby in step 814 the multimodal input processing system 55 moves the virtual cursor 261 to the location of the directed eye movement. In other embodiments, the first input mode includes gesture recognition technology such as a ToF camera 54 in FIG. 2 that detects a user gesture such as finger pointing. In response, in step 814 the multimodal input processing system 55 moves the virtual cursor 261 to a desired object, listed item, or the like at the location identified by the gesture. The virtual cursor 261 may be moved according to a different second input mode than the first input mode used for activating the virtual cursor 261. For example, eye gaze technology may be used to both activate and move the virtual cursor 261 to a desired location. In another example, gesture recognition technology may be used to activate the virtual cursor 261, while eye gaze technology may be used to move the virtual cursor 261. The mode controller 380 of the multimodal input processing system 55 may permit multiple input modes to be used to activate and move the virtual cursor 261.

In step 816, the desired object, listed item, or the like of interest may be selected by a third input mode, which may be the same as or different than the first and second input modes of steps 812 and 814, respectively. For example, after the virtual cursor 261 is moved in step 814 to a location of interest, the object or the like at the location of interest can be selected by a speech command, tactile input, or other predetermined input mode.

As described herein, one of the input modes to the multimodal input processing system 55 is a voice assistant, or digital processor that uses voice recognition, speech synthesis, natural language processing (NLP), and the like to provide a service through an application executed for communicating via the multimodal input processing system 55 with the window display such as HUD 60. A well-known application for voice assistants relates to navigation, for example, where the driver interacts with the voice assistant by orally submitting a destination address, request for directions, and so on.

Conventional navigation applications determine a destination either by processing an address, point of interest (POI), or category search. However, in some embodiments of the inventive concepts, additional features such as gazing at a target, reusing a place of interest that is not specified in a typed address or other location information to a navigation system, but is instead determined from other sources, such as a recent interaction between driver and passenger for a current navigation, or a radio station which mentions the location name, or written on a piece of paper.

Referring again to FIG. 3, in some embodiments, the multimodal input processing system 55 further comprises a navigation controller 390 that outputs data from a vehicle navigation system 80 to the second electronic device, e.g., HUD 60, and allows a display of the navigation data to be controlled from multiple input modes, for example, provided by a combination of touchpad, keyboard-mapping, gesture recognition, speech recognition, augmented reality, sensing and/or monitoring cameras.

Referring again to FIG. 9, illustrated is an embodiment of the computer architecture 100 that includes data flow paths between elements of the architecture, in accordance with aspects of the inventive concepts. A feature according to some embodiments is to permit a user to enter street addresses or other destination location data to a navigation system in a safe and efficient manner by using different input modes than typing text into a keyboard of a navigation device. In some embodiments, the method 900 can be applied to autonomous or partially autonomous vehicles, for example, autonomous ground vehicles, driverless or driver-assisted automobiles, and so on where various inputs regarding a requested navigation destination are received and executed.

A camera 54, scanner, or other electronic detection device that is used for destination inputs by processing an image from the contents of a document 11. In some embodiments, the document 11 is a piece of paper with handwritten or typed text. In other embodiments, the document 11 is a photograph, printed hotel reservation, or the like that includes address-related text and/or other information from which a desired destination location can be determined, for example, the OCR software 56 and/or other related information extraction technology 71.

In flow path 912a, the OCR software 56 and/or other related information extraction technology 71 determines the address of interest from the image of the document 11. In particular, the OCR software 56 can extract text, characters, keywords, or the like such as street numbers, street, city, or state names, zip codes, and so on. In some embodiments, a camera 54 or related sensor is programmed with or otherwise in communication with a special-purpose computer that stores and executes the OCR software 56 or related technology to scan the contents of the document 11 and to parse or otherwise distinguish and recognize an address among the contents. One or more sensors such as camera 54 as with other embodiments may be located at the windshield 54 as shown in FIG. 2 and/or positioned at other locations of the vehicle such as the vehicle door, back seat, and so on. In some embodiments, the camera 54 may be a mobile camera that captures the contents and/or other destination inputs, photographs in the document, and so on for output to the system 55. In other embodiments, the OCR software 56 is on a standalone computer that communicates indirectly with the camera 54 via the multimodal input processing system 55, or communicates directly with the camera 54. The determined address can be stored at the multimodal input processing system 55 or other data repository for subsequent retrieval and processing.

In some embodiments where the OCR software 56 cannot identify an address or other useful information from the extracted text or the like, the method 900 proceeds to flow path 912b where the extracted data is analyzed by an information extraction technology 71, which may include cognitive computing, artificial intelligence, analytics, or the like to determine an address. The address determined from the OCR software 56 or information extraction technology 71 can be stored for subsequent recognition by its characteristic form, e.g., dependent on language, country, and so on.

In other embodiments where the OCR software 56 cannot identify an address or other useful information from the extracted text or the like, the method 900 proceeds to flow path 912c where the extracted data is output directly to the navigation system 80 or search engine or the like to determine from the text in the extracted data an address, or a listing of possible addresses. The navigation system 80 may be an application of a mobile electronic device 12 or may be part of a remote computer in communication with the system 55 via a network 10. In some embodiments, the navigation system 80 may be part of an autonomous or semi-autonomous vehicle for providing directions to an intended destination.

In flow path 914, a user such as the vehicle driver, passenger, or other user can utter into a microphone 13 or other audio input device an oral command such as "drive me there. In flow path 916, the system 55 outputs the address, e.g., parsed by the OCR software 56 and/or information extraction technology 71 or otherwise determined from the document 11 and/or speech uttered via the microphone 13 and converted to data, to the vehicle navigation system 80, which processes the address accordingly and provides turn-by-turn directions and/or other navigation information. In some embodiments, the multimodal input processing system 55 receives via flow path 916 a navigation result from the navigation system 80 such as current location, status, street maps, and so on.

In flow path 918, the received navigation data can be displayed by the system 55 in real-time on the windshield 51, for example, executed by HUD 60, for updating the displayed map 64. In other embodiments, a mobile electronic device 12 such as a driver or passenger smartphone may receive the navigation data in addition to or instead of the HUD 60. In some embodiments, in flow path 918, the navigation system 80 provides multiple results from a received address, in which case a list, for example, list 66 shown in FIG. 10 is displayed so that a user can select an address from the displayed list of address options in the list 66.

Figure 10:
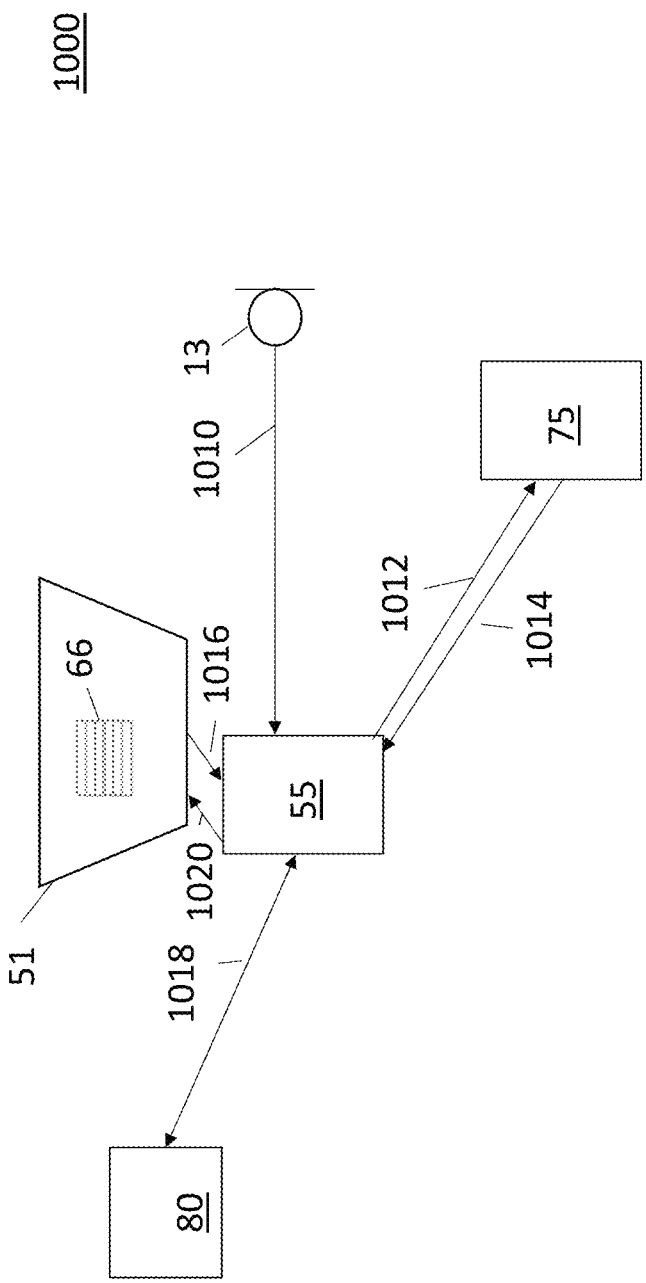

In a related application, as shown in FIG. 10, a first flow path 1010, 1012 extends between the microphone 13 and a speech recognition system 75, for example, configured to perform Voice Activity Detection (VAD), Automatic Speech Recognition (ASR), Natural Language Understanding (NLU), or a combination thereof. The speech recognition system 75 can be executed in response to flow path 1012 to detect and process any speech occurring in a vehicle, for example, between a driver and passenger. In some embodiments, the speech recognition system 75 processes the detected speech by employing models and analyzing audio data, for example, the microphone 13 detecting speech provided by a driver and/or passenger. Other information extraction tools may equally apply such as named entity recognition (NER), automatic speech recognition (ASR), natural language understanding (NLU), and so on, for recognizing the address of interest. Information extraction tools such as the speech recognition system 75 may be one of the external applications 70 described in FIG. 1.

Accordingly, when a vehicle driver, passenger, or other user speaks a command such as "drive me there," the speech recognition system 75 or the like in flow path 1014 can in response output a result such as a selected last memorized address. Alternatively, instead of flow path 1010 a spoken command received via microphone 13, a list 66 that includes the address can be displayed at the windshield 51 for example, via HUD 60, for selection by the user, for example, using gaze detection, gesture technology, speech recognition, multi-modal text input such as XT9® technology, and/or other input mode described herein. Other details regarding the selected address may be displayed in real-time on the windshield 51 and/or selected electronic device 12. In this alternative embodiment, in flow path 1016 a command regard the selection by the user is output to the system 55 for subsequent processing.

In some embodiments, shown in flow path 1018, the multimodal input processing system outputs the selected address received from flow path 1010, 1014, or 1016 to the vehicle navigation system 80 which processes the address accordingly. In response, the multimodal input processing system 55 receives via flow path 1018 navigation data such as current location, status, street maps, turn-by-turn directions and/or other navigation information and so on for displaying in real-time in flow path 1020 on the windshield 51 and/or display of an electronic device such as the user's smartphone 12.

Figure 11:
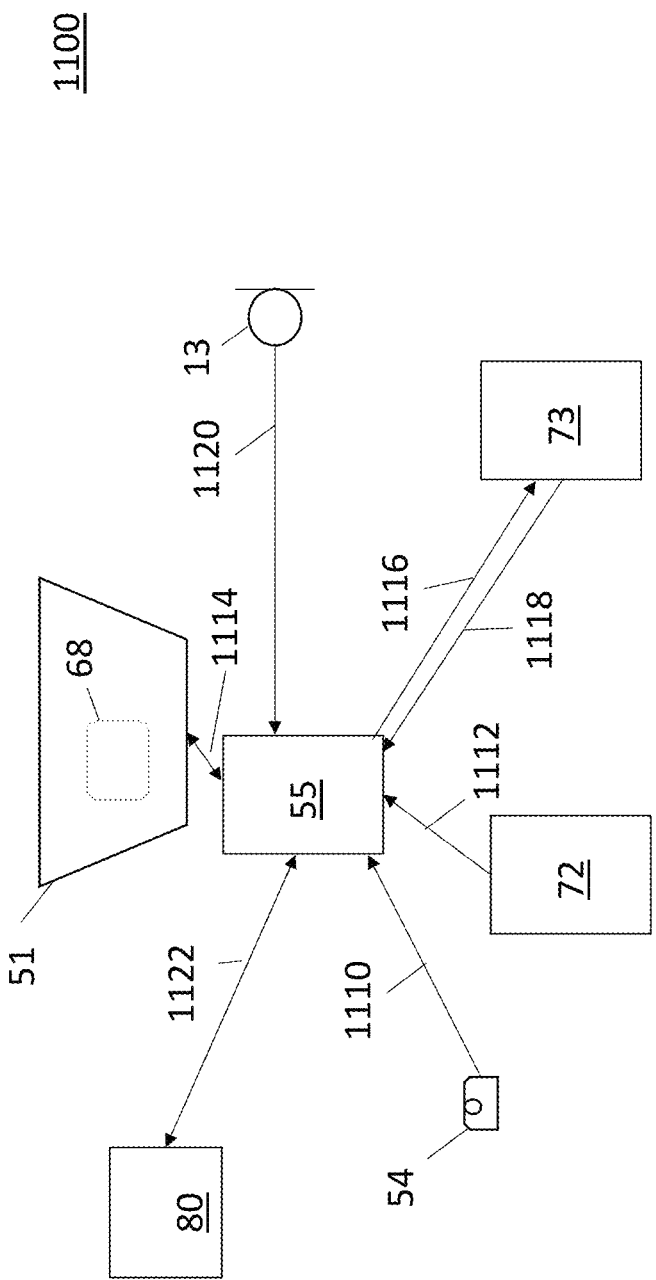

In a related application, as shown in FIG. 11, the first flow path 1110 extends between a gaze detection device, for example, camera 54 (also described in FIG. 9), and multimodal input processing system 55 (instead of or in addition of the microphone 13) for providing an input establishing where a user, e.g., driver, is looking. A second flow path 1112 extends between a 3D modeling computer 72 and the multimodal input processing system 55 for providing a 3D model of a region, e.g., city, town, or other geography in proximity of the vehicle, and within the field of view of the driver's gaze. In some embodiments, the navigation system 80, search engine, and/or other data provider provides 3D model information for processing the collected images collected by the input device, e.g., camera or the like, which is processed as destination entry data. In doing so, the multimodal input processing system 55 receives the inputs via flow paths 1110 and 1112.

In some embodiments, an image 68 of the 3D model is displayed in flow path 1114 on the windshield 51. In flow path 1116, the multimodal input processing system 55 outputs data regarding the gaze detection and 3D model to an external application 70, for example, an analysis tool 73 which performs a visibility analysis to identify buildings, landmarks, and/or related objects viewed by the user and detected by the gaze detection device 54. A result of the visibility analysis is provided in flow path 1118 to the multimodal input processing system 55, which also receives in flow path 1120 a command via a microphone 13 to drive the user to the building, landmark, or the like identified from the visibility analysis.

In some embodiments, shown in flow path 1122, the multimodal input processing system outputs the selected address to the vehicle navigation system 80 which processes the address accordingly. In some embodiments, the multimodal input processing system 55 receives in response navigation data such as current location, status, street maps, and so on for displaying in real-time on the windshield 51. Various techniques may be used to display such information is displayed on the windshield. Although a HUD 60 is described as providing one technique, embodiments herein are not limited to use of the HUD 60 and therefore other projection or display devices may equally apply.

Figure 12:
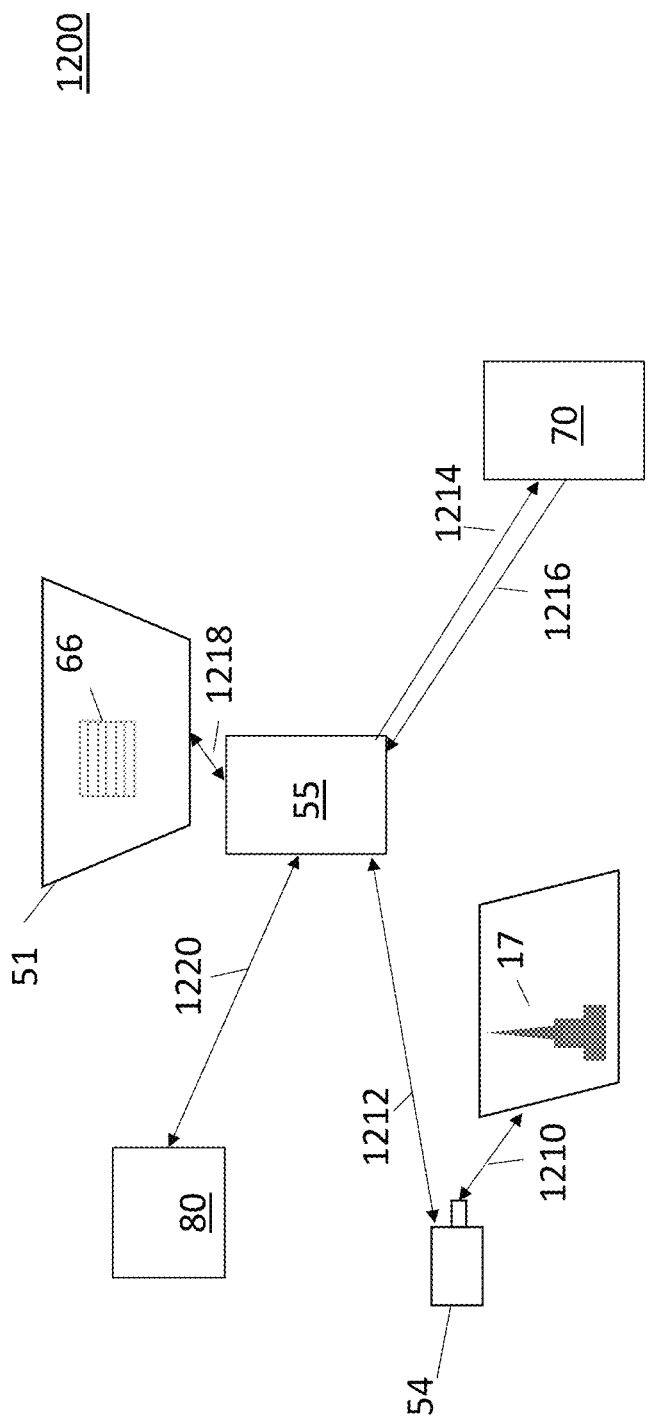

In a related application, as shown in flow path 1210 of FIG. 12, a camera 54, scanner, or other electronic detection device processes an image 17 from the photograph of a building, landmark, or other indicator of a location of interest. In some embodiments, the image 17 may include additional location information such as nearby restaurants, hotels, stores, and so on. In flow path 1212, the camera 54 outputs the image contents to the multimodal input processing system 55 for processing.

In flow path 1214, the multimodal input processing system 55 can determine whether the image 17 can be used to determine a location for navigation or other location identification purposes. In some embodiments, an external application system 70 can include a database that stores a listing of locations. The identified location in the image can be compared by the multimodal input processing system 55 to the records of the other locations in the database. In flow path 1216, comparison data such as images and analysis results are exchanged.

In some embodiments, multiple results are generated. Here, the results may be output in flow path 1218 for display in a list 66, for example, on the windshield 51. The list can include pictures for display instead of or in addition to addresses or other text information. In some embodiments, shown in flow path 1210, the multimodal input processing system outputs a selected address to the vehicle navigation system 80 which processes the address accordingly. In some embodiments, the multimodal input processing system 55 receives navigation data such as current location, status, street maps, and so on for displaying in real-time on the windshield 51.

Referring again to flow path 2110, the image 17 of the picture or the like may reveal several locations of interest. Here, the user can activate a haptic device, facial or gesture recognition system, or other input device that selects the location of interest among the multiple locations. The selected location may be displayed in the form of a picture, graphic, text, or other form if display on the windshield 51 and/or other electronic display in the vehicle.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the invention, which are, for clarity, described in the context of separate embodiments, may also be provide in combination in a single embodiment. Conversely, various features of the invention which are, for brevity, described in the context of a single embodiment may also be provided separately or in any suitable sub-combination.

For example, it will be appreciated that all of the features set out in any of the claims (whether independent or dependent) can combined in any given way.

What is claimed is:

1. A method of providing input to a computer in a vehicle, said method comprising:
    forming an electronic communication between a first electronic device and a display of a second electronic device that is viewable by a user from a location in the vehicle, wherein forming the electronic communication includes the first electronic device providing a first input channel for the second electronic device;
    executing a multimodal application that permits the user to interact with the display of the second electronic device by a combination of the first input channel and at least one second input channel for the second electronic device; and
    controlling, by the combination of the first and second input channels, a display of the first electronic device, wherein the first and second electronic devices differ from each other.

2. The method of claim 1, wherein the display of the second electronic device includes a touch-sensitive windshield of a vehicle.

3. The method of claim 1, wherein the first electronic device comprises a touch-sensitive display having a first touchpad input and a second touchpad input, wherein the first touchpad input responds to a first pressure and the second touchpad input response to a second pressure that is greater than said first pressure, wherein the first input channel comprises the first touchpad input and the second input channel comprises the second touchpad input.

4. The method of claim 1, wherein the multimodal application homologically maps positions that are on a display of the first electronic device to a virtual keyboard, wherein the virtual keyboard is displayed by the second electronic device on a windshield of the vehicle.

5. The method of claim 1, further comprising the first electronic device receiving a swipe from a user and, using the swipe, establishing a starting point on the second electronic device by activating a location on the display of the first electronic device that corresponds to the starting point on the display of the second electronic device.

6. The method of claim 1, wherein the first input channel comprises an input from a touch-sensitive keyboard.

7. The method of claim 1, wherein controlling the display of the first electronic device comprises:
    displaying a set of elements on the display of the second electronic device;
    activating a cursor at the display of the second electronic device;
    in response to a first input at the first electronic device, moving the cursor to identify an element of interest in the set; and,
    in response to a second input at the first electronic device, selecting the element of interest or object of interest,
    wherein the set is selected from the group consisting of a list and a group, and
    wherein the elements are selected from the group consisting of items and objects.

8. The method of claim 1, wherein the first input channel comprises a display of a touchpad computer.

9. The method of claim 1, wherein the first input channel comprises a data input from a computer device remote from a touchpad computer and wherein the computer device is in communication with the touchpad computer.

10. The method of claim 1, wherein the first electronic device captures an address, wherein the multimodal application processes the address for use by a navigation system, wherein, in response, the navigation system outputs navigation information to the second electronic device, and wherein the navigation information is related to the address that has been processed by the multimodal application.

11. The method of claim 1, wherein the first input channel comprises a camera that provides a digital photograph, text, or graphics from a document to an analysis system to determine an address that has been captured by the first electronic device.

12. The method of claim 1, wherein the first electronic device comprises a tactile input device.

13. The method of claim 1, further comprising: identifying objects in a field of view of the user and determining the address from the identified objects.

14. An apparatus comprising a multimodal input processing system comprising at least one processor, said multimodal input processing system being configured to:
    form an electronic communication between a first electronic device and a display of a second electronic device that is viewable by a user from a location in the vehicle;
    provide a first input channel from the first electronic device for the second electronic device;
    execute a multimodal application that permits the user to interact with the display of the second electronic device by a combination of the first input channel and at least one second input channel for the second electronic device; and
    control a display of the first electronic device by a combination of the first input channel and the at least one second input channel,
    wherein the first electronic device differs from the second electronic device.

15. The method of claim 1, wherein the first input channel comprises an eye-gaze detection device.

16. The method of claim 1, wherein the first input channel comprises a camera for gesture recognition.

17. The method of claim 1, wherein the first electronic device comprises a camera.

18. The method of claim 1, wherein the first electronic device comprises a touchpad computer.

19. The apparatus of claim 14, wherein the first input channel comprises a camera that provides a digital photograph, text, or graphics from a document to an analysis system to determine an address.

20. The method of claim 1, wherein the first electronic device comprises an eye-gaze detection device.

21. The method of claim 1, wherein the second electronic device comprises a heads-up display.

22. The method of claim 1, wherein the first electronic device comprises a heads-up display.

23. The apparatus of claim 14, wherein the multimodal application is configured to utilize assets of a vehicle computer and to share those assets with other electronic devices of the vehicle.

24. The method of claim 1, wherein the display of the second electronic device includes a heads-up display of a vehicle.

25. The method of claim 1, wherein the display of the second electronic device includes a device for projecting or displaying information on a windshield of a vehicle.

26. The apparatus of claim 14, further comprising a vehicle head unit that comprises said multimodal input processing system, wherein said multimodal input processing system stores and executes said multimodal application.

27. A method comprising:
providing a vehicle with a multimodal input processing system that stores and executes a multimodal application that supports an interaction in accordance with one or more voice and non-voice modes and that combines or otherwise permits operational coexistence of multiple user input modes during an interaction with a heads-up display in said vehicle, thereby allowing a vehicle driver, passenger, or other user in said vehicle to interact with a heads-up display of said vehicle through first and second input modes, said multimodal input processing system being part of or hosted by the vehicle;
establishing electronic communication between a mobile device and a heads-up display of said vehicle computer, wherein establishing said electronic communication comprises causing said mobile device to provide a first input mode for communication with said vehicle computer;
causing said multimodal input processing system to execute a multimodal application that permits said user to interact with said heads-up display by a combination of said first input mode and a second input mode, said second input mode being provided by said vehicle computer; and
receiving data using said first and second input modes; and
interacting with said heads-up display based on said data received from both said first input mode and said second input mode.

28. The method of claim 27, wherein providing said vehicle with said multimodal input processing system comprises
configuring a communication interface module of said multimodal input processing system to enable said vehicle and said multimodal input processing system to communicate and exchange information and data with systems and subsystems external to said vehicle and local to and onboard the vehicle and to enable said vehicle and said multimodal input processing system to communicate with external applications via a network cloud;
configuring a local applications processor in said multimodal input processing system to facilitate data exchanges between electronic devices of said vehicle;
providing a multimodal input processing system that comprises a processor coupled to a memory via a bus;
providing said multimodal input processing system with input and output devices for exchanging data processed by said multimodal input processing system said data comprising navigation system outputs comprising time sensitive-directions for a driver), incoming text messages converted to output speech, and vehicle status outputs;
providing said multimodal input processing system with a device signal translator that converts signals received from said mobile device to data for controlling said heads-up display, and
providing said multimodal input processing system with a mode controller that determines whether data received by said first and second modes are for controlling said heads-up display.

* * * * *